(12) United States Patent
Kim

(10) Patent No.: US 7,142,531 B2
(45) Date of Patent: Nov. 28, 2006

(54) METHOD AND SYSTEM OF RELAYING CALLS WITH A TONE PROVISION FUNCTION IN THE NEXT GENERATION MOBILE COMMUNICATION NETWORK

(75) Inventor: Hyung-Jo Kim, Gunpo-si (KR)

(73) Assignee: LG Electronics Inc., Seoul (KR)

( * ) Notice: Subject to any disclaimer, the term of this patent is extended or adjusted under 35 U.S.C. 154(b) by 933 days.

(21) Appl. No.: 10/024,569

(22) Filed: Dec. 21, 2001

(65) Prior Publication Data

US 2002/0080797 A1    Jun. 27, 2002

(30) Foreign Application Priority Data

Dec. 23, 2000    (KR) ............................... 2000-81096

(51) Int. Cl.
*H04L 12/28* (2006.01)
(52) U.S. Cl. .................. 370/351; 370/395.5; 370/401; 370/467
(58) Field of Classification Search ................ 370/351, 370/352, 401, 395.1, 395.5, 465, 338, 349, 370/466, 467
See application file for complete search history.

(56) References Cited

U.S. PATENT DOCUMENTS 6,141,341 A    10/2000   Jones et al.
6,487,209 B1 *  11/2002  Valentine et al. ........... 370/401
6,765,912 B1 *  7/2004   Vuong ..................... 370/395.2
2006/0133348 A1 * 6/2006  Ho ............................. 370/352

OTHER PUBLICATIONS

Doug Allen, Megaco and MGCP, Oct. 5, 2000, Network Magazine.*
RFC 2705, RFC 791, RFC793.*

* cited by examiner

*Primary Examiner*—John Pezzlo
*Assistant Examiner*—Inder Pal Mehra
(74) *Attorney, Agent, or Firm*—Fleshner & Kim LLP.

(57) ABSTRACT

The present invention relates to a method and system of relaying calls with a tone provision function in the next generation mobile communication network. The call relaying procedures and functions support a Voice over Internet Protocol (VoIP) function between an originating gateway controller and a terminating gateway controller, by modifying the Bearer Independent Call Control (BICC) protocol, while receiving the tone from an external tone generating device using the BICC protocol, Media Gateway Control Protocol (MGCP), and 3rd Generation-Inter-Operability Service (3G-IOS) protocol in the next generation mobile communication network based on an Internet Protocol (IP). The BICC, MGCP and 3G-IOS protocols improve the IP-based network by supporting the VoIP function between the originating gateway controller and the terminating gateway controller, while receiving the tone from an external tone generating device. This is accomplished by redefining the BICC signal processing procedures so that APM messages may be transmitted and received multiple times between the originating gateway controller and the terminating gateway controller.

15 Claims, 4 Drawing Sheets

METHOD AND SYSTEM OF RELAYING CALLS WITH A TONE PROVISION FUNCTION IN THE NEXT GENERATION MOBILE COMMUNICATION NETWORK

BACKGROUND OF THE INVENTION

1. Field of the Invention

The present invention relates to a method and system of relaying calls and, more particularly, to a tone provision function in the next generation mobile communication network.

2. Background of the Related Art

'ITU-T Q.1901 BICC' is a protocol for the next generation core network that allows Narrow-Band Integrated Services Digital Network (ISDN) User Part (ISUP) call processing function, supporting the Narrow-Band ISDN services recommended in 'ITU-T Q.761–769', to be applied in packet-based networks, such as an Asynchronous Transfer Mode (ATM) network or an Internet Protocol (IP) network, regardless of the bearer technology or the signaling message transport method.

FIG. 1 illustrates a configuration of a related communication network that relays calls between gateway controllers using the ITU-T Q.1901 Bearer Independent Call Control (BICC) protocol. The communication network includes two gateway controllers 11 and 14 and two wireless gateways 12 and 15. The information transmission between the gateway controllers 11 and 14 and the wireless gateways 12 and 15 is conducted through the IP-based core network 13, using IP. The protocol stack between the gateway controllers 11 and 14 includes BICC, IP, and Transfer Control Protocol (TCP) or ATM. On the other hand, the protocol stack between the gateway controllers 11 and 14 and the wireless gateways 12 and 15 includes Media Gateway Control Protocol (MGCP), $3^{rd}$ Generation-Inter-Operability Service (3G-IOS), IS-41D, IP, and TCP or ATM.

Furthermore, the gateway controllers 11 and 14 employ MGCP to control resources of the wireless gateways 12 and 15, and the BICC protocol is used to support the relay calls between the gateway controllers 11 and 14.

The related art method of relaying calls in the next generation mobile communication network is illustrated in FIG. 2. Initially, the originating wireless gateway 12 transmits a service request message (3G-IOS_CM_Service_Request) to the originating gateway controller 11, wherein the service request message (3G-IOS_CM_Service_Request) is a message announcing a call attempt from a mobile device. The originating gateway controller 11 confirms the service request message (3G-IOS_CM_Service_Request) and transmits a resource assignment request message (3G-IOS_Assignment_Request) to the originating wireless gateway 12, requesting assignment of a radio channel.

The originating wireless gateway 12 receives the resource assignment request message (3G-IOS_Assignment_Request) and transmits a response message (3G-IOS-Assignment_Complete) to the originating gateway controller 11. The originating gateway controller 11 transmits a connection instruction message (MGCP_CRCX) to the originating wireless gateway 12, requesting a resource assignment for the connection with the core network 13. An available radio channel can be selected at the side of the base station and TCP/IP ports are opened at the side of the originating wireless gateway 12, in response to the connection instruction message. In this manner, the resource assignment for the core network connection is requested and confirmed. Then, the originating wireless gateway 12 transmits a response message (MGCP_CRCX_Ack), including the information on the assigned core network connection (i.e., the core network IP address and IP port number, bandwidth information, etc.), to the originating gateway controller 11.

Subsequently, the originating gateway controller 11 transmits an Initial Address Message (IAM; BICC_IAM), including information on the call receiver, the caller, and other information regarding the core network connection of the originating wireless gateway 12, etc., to the terminating gateway controller 14 in order to request a BICC call connection.

The terminating gateway controller 14 executes 3G-IOS paging procedures to send paging request messages (3G-IOS_Paging_Request) to the wireless gateways under its management, wherein the paging request message (3G-IOS_Paging_Request) is used to identify the terminating wireless gateway 15 presently connected with the call receiver. Then, the terminating wireless gateway 15, currently connected to the call receiver, transmits the paging response message (3G-IOS_Paging_Response) to identify itself to the terminating gateway controller 14. Thereafter, the terminating gateway controller 14 transmits the resource assignment request message (3G-IOS_Assignment_Request) to the terminating wireless gateway 15, and the terminating wireless gateway 15 returns a response message (3G-IOS_Assignment_Complete) to the terminating gateway controller 14.

The terminating gateway controller 14 requests and confirms the resource assignment, for the connection, with the core network 13, by transmitting the core network IP address and IP port information, bandwidth information, etc., of the originating wireless gateway 12. This information is received by the terminating gateway controller 14 in the IAM (BICC_IAM). The terminating gateway controller 14 transmits this information to the terminating wireless gateway 15 through the connection instruction message (MGCP_CRCX). The terminating wireless gateway 15 then transmits a response message (MGCP_CRCX_Ack) and an alert message (3G-IOS_Alert) to the terminating gateway controller 14 to inform it that the call receiver is being called.

Thereafter, the terminating gateway controller 14 transmits an Address Complete Message (ACM) (BICC_ACM) to the originating gateway controller 11, informing it that the call receiver is being called. The ACM is a return message informing the originating gateway controller 11 that all of the address information required to identify the call receiver has been received.

After the terminating wireless gateway 15 transmits a connect message (3G-IOS_Connect) to the terminating gateway controller 14, informing it that the call receiver answered the call, the terminating gateway controller 14 transmits an Answer Message (ANM) (BICC_ANM) to the originating gateway controller 11. The ANM is another return message informing the originating gateway controller 11 that the call receiver answered the call. The ANM initiates the imposition of a service charge, if the connected call is a domestic call, or starts measuring the communication time, for the calculation of an international call service charge, if the connected call is an international call.

Thereafter, the terminating gateway controller 14 requests and confirms the resource assignment for the connection with the core network 13, by transmitting the connection instruction message (MGCP_CRCX) to the terminating wireless gateway 15. The MGCP_CRCX message requests the resource assignment, for the terminating wireless gateway's connection with the core network, to establish voice communication between subscribers. The terminating wireless gateway 15 transmits an acknowledgment message (MGCP_CRCX_Ack), including information on the assigned core network connection, to the terminating gateway controller 14.

The terminating gateway controller 14 then transmits an Application Transport Mechanism (APM) message (BICC_APM) to the originating gateway controller 11, containing information on the core network connection of the wireless gateway 15. This information includes the core network IP address and IP port number, bandwidth information, etc.

Accordingly, the originating gateway controller 11 transmits a modification connection message (MGCP_MDCX), to transfer information regarding the core network connection of the terminating wireless gateway 15, to the originating wireless gateway 12 and receives an acknowledgment message (MGCP_MDCX_Ack) from the originating wireless gateway 12 in return. Then, the originating gateway controller 11 responds to the terminating gateway controller 14 using the APM message (BICC_APM).

Thereafter, the connection for voice communication between the originating wireless gateway 12 and the terminating wireless gateway 15 is established, using Voice over IP (VoIP) technology, through the core network 13.

The above-described method of controlling relay gateways, in the related art next generation mobile network, adopts the BICC protocol of ITU-T Q.1901. However, the BICC protocol does not include a tone provision function. Furthermore, because the originating gateway controller and the terminating gateway controller may transmit and receive the APM message only once, the transmission of an APM message for the purpose of provisioning a ring back tone is impossible.

Moreover, since the BICC protocol is still in the pre-released state, it is not regarded as a flawless standard. Also, because recommendations on the call processing procedures only concern the ATM based network, it is not yet appropriate to commercialize the VoIP products, in the IP-based network, using the call processing procedures recommended in the BICC protocol.

SUMMARY OF THE INVENTION

An object of the invention is to solve at least the above problems and/or disadvantages and to provide at least the advantages described hereinafter.

It is, therefore, an object of the present invention to provide a method and system of relaying calls in the IP-based next generation mobile communication network using the BICC protocol.

It is another object of the present invention to provide the tone provision function, in the next generation mobile communication network, by redefining the BICC signal processing procedures.

A further object of the present invention is to improve VoIP products, in the IP-based network, by supporting the VoIP function between an originating gateway controller and a terminating gateway controller, through a modification of the BICC protocol.

It is a further object of the present invention to support the VoIP function, while receiving the tone from an external tone generating device, using the BICC, MGCP and 3G-IOS protocols in the IP-based next generation mobile communication network.

In order to achieve the above-mentioned objects, the method of relaying calls with a tone provision function in a next generation mobile communication network, according to a preferred embodiment of the present invention, supports the Voice over Internet Protocol (VoIP) function between an originating gateway controller and a terminating gateway controller by modifying the BICC protocol, while receiving the tone from an external tone gateway using a Bearer Independent Call Control (BICC) protocol, a Media Gateway Control Protocol (MGCP), and a 3G-Inter-Operability Specification (3G-IOS) in the next generation mobile communication network.

Preferably, the modified BICC protocol conducts the tone processing by transmitting/receiving Application Transport Mechanism (APM) messages multiple times between the gateway controllers.

Preferably, the MGCP is used to control resources of the tone gateway in the gateway controllers.

The method of relaying calls with a tone provision function in a next generation mobile communication network, according to another preferred embodiment of the present invention, comprises the originating gateway controller instructing and confining the resource assignment at the originating wireless gateway, for the connection with a core network; the terminating gateway controller connecting to the core network, after searching for the terminating wireless gateway, in accordance with the originating gateway controller's call connection request; the terminating gateway controller connecting the tone gateway to the core network and, at the same time, the tone gateway generating the tone and transmitting the tone to the caller; and connecting the voice call, via the core network connection, between the originating wireless gateway and the terminating wireless gateway.

Preferably, the step of connecting to the core network comprises the originating gateway controller requesting a call connection by transmitting an Initial Address Message (IAM) to the terminating gateway controller; the terminating gateway controller searching for the terminating wireless gateway, connected to the call receiver, by conducting paging request and response operations; the terminating gateway controller instructing and confirming the resource assignment, at the terminating wireless gateway, for the connection with the core network, using the bearer information of the originating wireless gateway included in the IAM; and the terminating wireless gateway instructing and confirming a radio channel assignment for the call receiver.

Preferably, providing the tone comprises the terminating gateway controller instructing and confirming the resource assignment at the tone gateway, for the connection to the core network, and, at the same time, the tone gateway providing the paging tone to the caller in accordance with the request of the terminating gateway controller; and the terminating gateway controller confirming the status of the call receiver and notifying the originating gateway controller of the confirmed status and, at the same time, the tone gateway providing the ring back tone to the caller in accordance with the request of the terminating gateway controller.

Here, providing the paging tone comprises the terminating gateway controller instructing and confirming the resource assignment by transmitting a tone connection instruction message to the tone gateway; the tone gateway transmitting a response message including information on the assigned core network connection to the terminating gateway controller; the terminating gateway controller transmitting the bearer information of the tone gateway by transmitting an Application Transport Mechanism (APM) message to the originating gateway controller; the originating gateway controller instructing and confirming a resource assignment modification by transmitting a modification connection message to the originating wireless gateway and, at the same time, responding to the terminating gateway controller through an APM message; the terminating gateway controller requesting the paging tone by transmitting a notification request message to the tone gateway; and the tone gateway transmitting a response message, for the notification demand message, to the terminating gateway controller and, at the same time, providing the paging tone to the caller via the originating wireless gateway.

Providing the ring back tone comprises the terminating wireless gateway transmitting a response message for the paging request of the terminating gateway controller; the terminating gateway controller requesting the radio channel resource assignment by transmitting a resource assignment request message to the terminating wireless gateway; the terminating wireless gateway instructing and confirming the radio channel assignment for the call receiver and transmitting a response message and an announcement message to the terminating gateway controller; the terminating gateway controller transmitting an Address Complete Message (ACM) to the originating gateway controller and, at the same time, requesting the ring back tone by transmitting the notification request message to the tone gateway; and the tone gateway transmitting a response message, for the notification request message, to the terminating gateway controller and, at the same time, providing the ring back tone to the caller via the originating wireless gateway.

Preferably, connecting the voice call comprises the terminating wireless gateway transmitting an access message to the terminating gateway controller to notify it that the call receiver has responded to the call; the terminating gateway controller transmitting an Answer Message (ANM) to the originating gateway controller; the terminating gateway controller instructing and confirming the resource assignment by transmitting a connection instruction message to the terminating wireless gateway; the terminating wireless gateway transmitting a response message, including information on the assigned core network connection, to the terminating gateway controller; the terminating gateway controller transmitting the information on the core network connection, of the terminating wireless gateway, by transmitting an Application Transport Mechanism (APM) message to the originating gateway controller; the originating gateway controller transmitting a modification access message to the originating wireless gateway and responding to the terminating gateway controller through the APM message, after receiving a response message for the modification access message; and conducting the voice call connection via the core network connection between the originating wireless gateway and the terminating wireless gateway.

The ANM is a return message indicating that the call receiver responded to the call, which initiates the imposition of the service charge on the caller in the case of a domestic call or initiates the measurement of the communication time for the calculation of the international service charge, in the case of an international call.

The system of relaying calls with a tone provision function in a next generation mobile communication network, according to a preferred embodiment of the present invention, comprises an originating wireless gateway for conducting modifications in the resource assignment of the originating side, according to a resource assignment modification instruction, and transmitting information on the modified core network connection; a terminating wireless gateway for conducting the resource assignment of the terminating side, according to a resource assignment instruction, and transmitting information on the assigned core network connection; a tone gateway for transmitting information on the assigned core network connection, after the assignment of the resource according to the resource assignment instruction, and providing tone signals according to a tone provision instruction; a terminating gateway controller for instructing and confirming the resource assignment by the tone gateway, transmitting an Application Transport Mechanism (APM) message, instructing and confirming the tone gateway's tone provision, and transmitting another APM message after instructing and confirming the resource assignment by the terminating wireless gateway; and an originating gateway controller for instructing and confirming the modification of the resource assignment, according to the APM message of the terminating gateway controller, and responding to the terminating gateway controller.

Preferably, the protocol stack between the gateway controllers and the tone gateway contains a Media Gateway Control Protocol (MGCP), an Internet Protocol (IP), and a Transfer Control Protocol (TCP) or an Asynchronous Transfer Mode (ATM).

Preferably, the gateway controllers, the wireless gateways, and the tone gateway are connected with one another via the core network using the IP.

Preferably, the gateway controllers control the relay gateways using a Bearer Independent Call Control (BICC) protocol.

Preferably, the gateway controllers employ the Media Gateway Control Protocol (MGCP) for controlling resources of the wireless gateways and the tone gateway.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
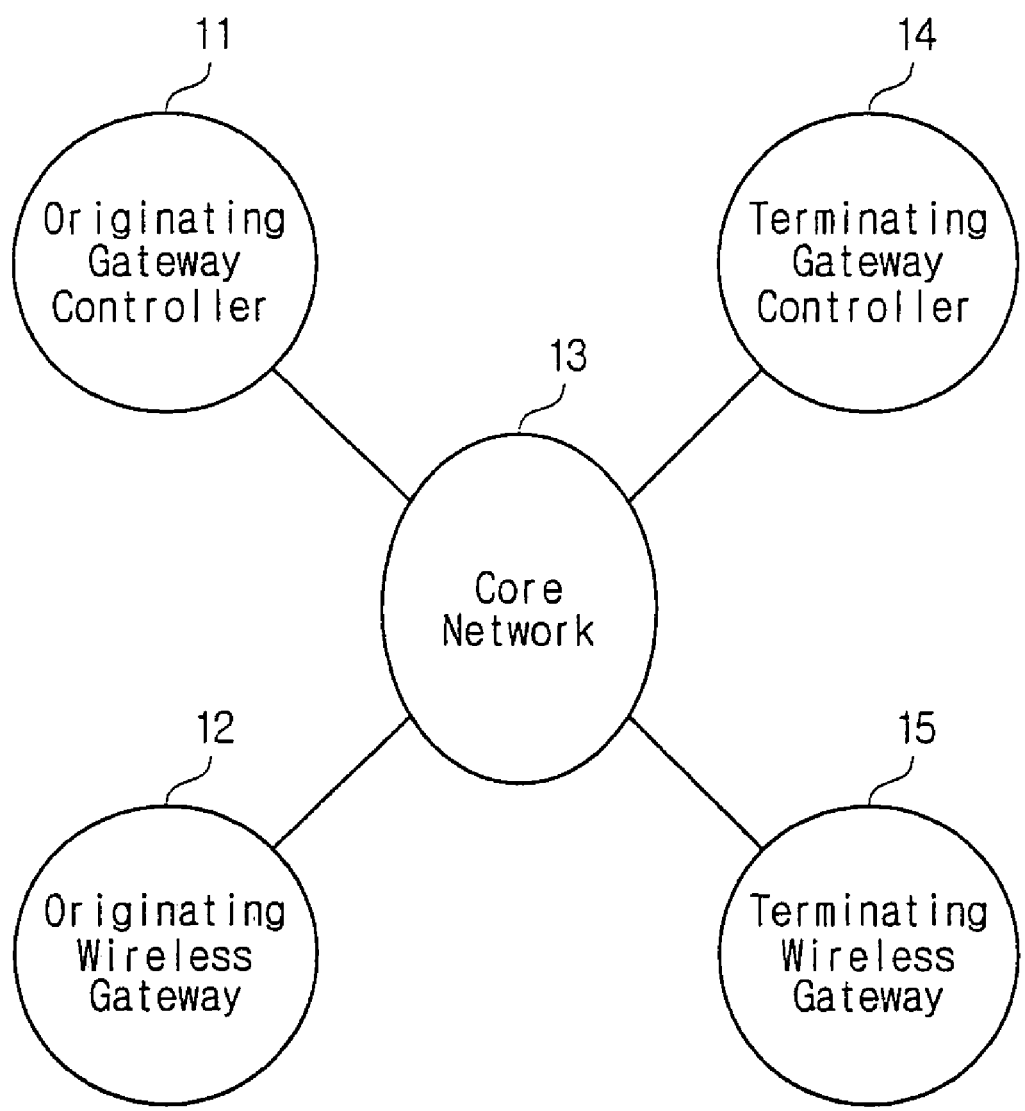
FIG. 1 illustrates a next generation mobile communication network of the related art.
Figure 2:
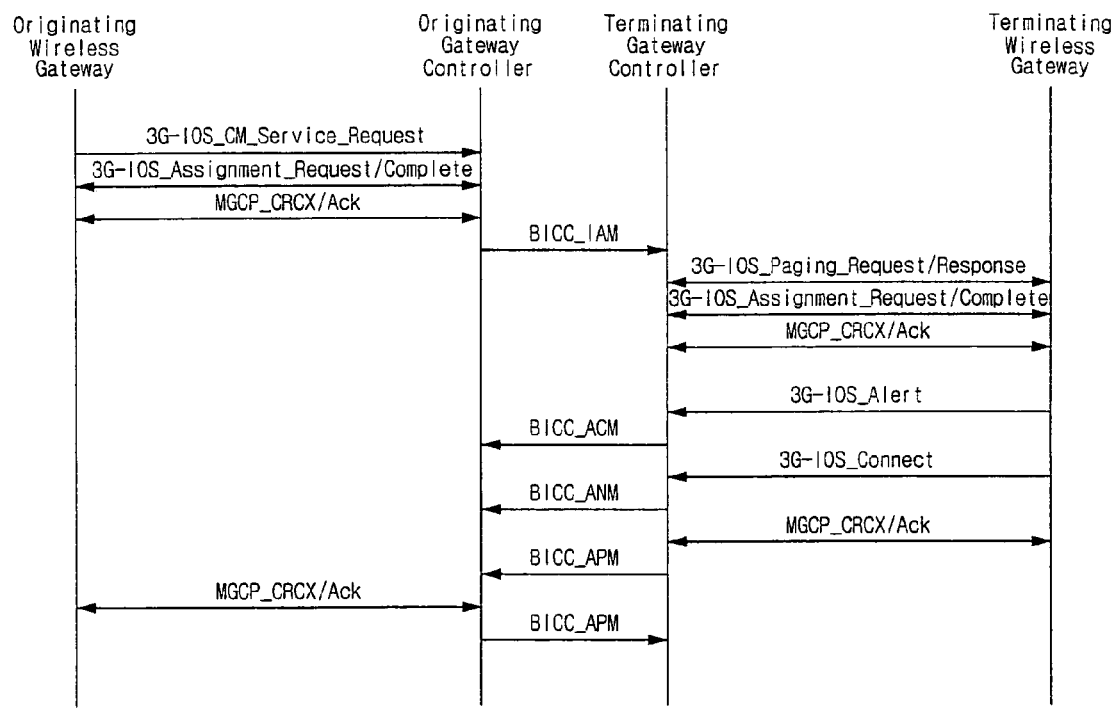
FIG. 2 illustrates a flow chart of the call relaying method in the communication network of the related art.
Figure 3:
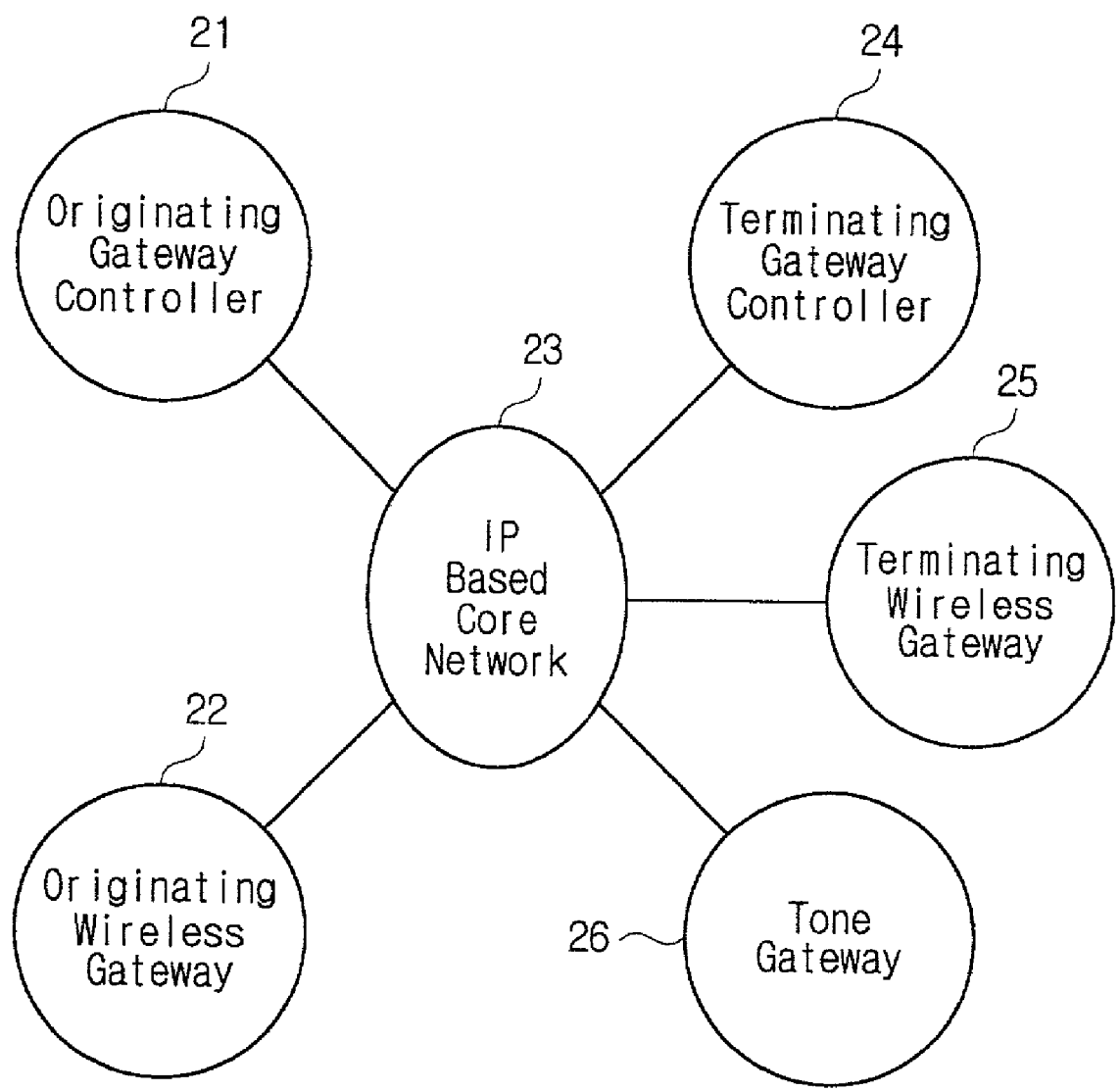
FIG. 3 illustrates the next generation mobile communication network according to a preferred embodiment of the present invention.

FIG. 3 illustrates a diagram showing the next generation mobile communication network according to a preferred embodiment of the present invention. The next generation mobile communication network for the call relaying with a tone provision function includes two gateway controllers 21 and 24, two wireless gateways 22 and 25, and a tone gateway 26. The gateway controllers 21 and 24, wireless gateways 22 and 25, and the tone gateway 26 are connected with one another through a core network 23, using the IP protocol.

The protocol stack between the gateway controllers 21 and 24 includes the BICC, IP, and TCP or ATM. The protocol stack between the gateway controllers 21 and 24 and the wireless gateways 22 and 25 includes MGCP, 3G-IOS, IS-41D, IP, and TCP or ATM. The protocol stack between the gateway controllers 21 and 24 and the tone controller 26 includes MGCP, IP, and TCP or ATM.

The gateway controllers 21 and 24 use the MGCP to control resources of the wireless gateways 22 and 25 and the tone gateway 26. The BICC protocol is used between the gateway controllers 21 and 24 to support the call relay.

Figure 4:
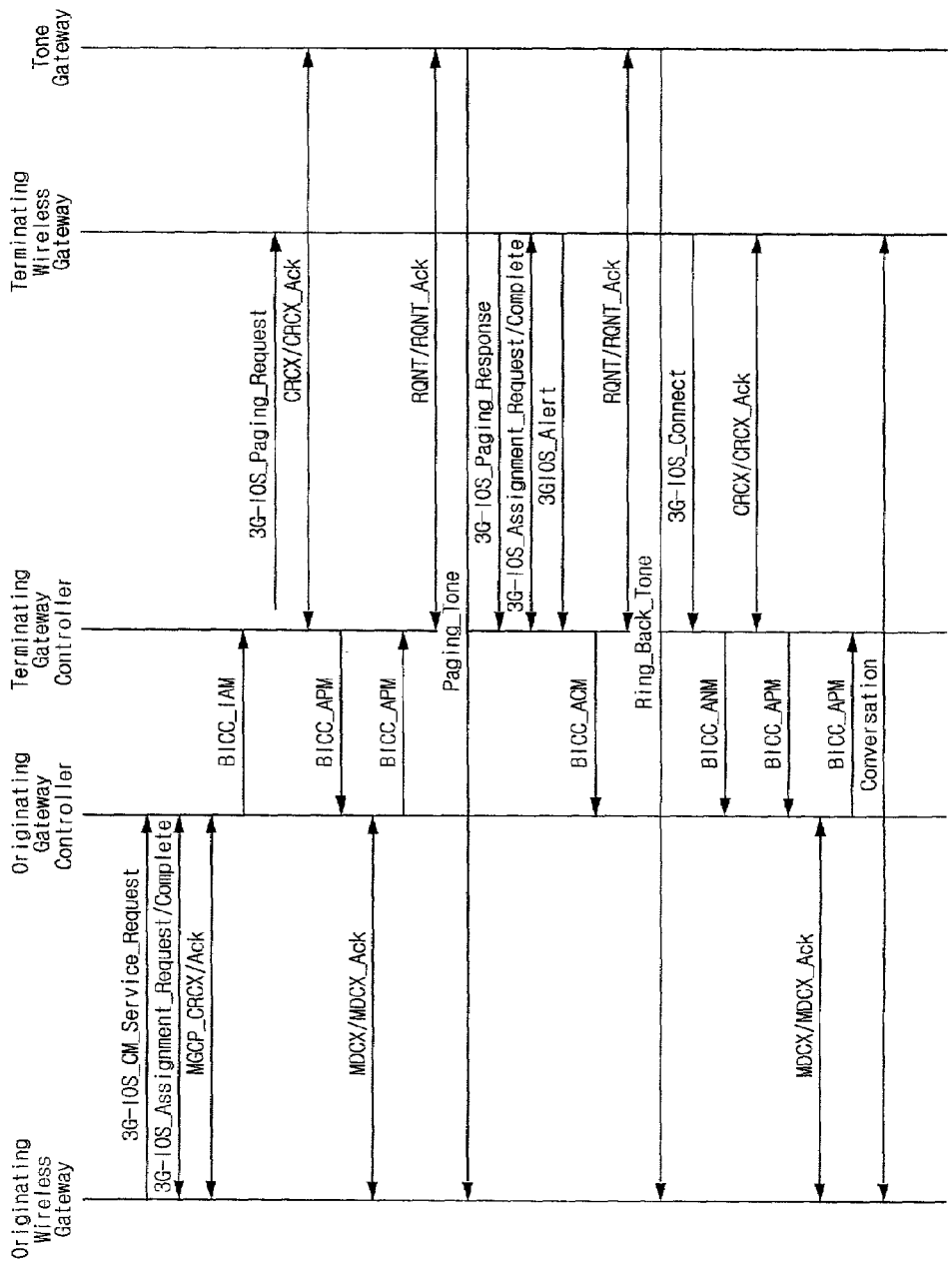
FIG. 4 illustrates a flow chart of the method of relaying calls with a tone provision function in the next generation mobile communication network, according to a preferred embodiment of the present invention.

The method of relaying calls with a tone provision function in the next generation mobile communication network, according to a preferred embodiment of the present invention, will now be explained with reference to FIG. 4. First of all, if the originating wireless gateway 22 sends a service request message (3G-IOS_CM_Service_Request) to the originating gateway controller 21, announcing a request for a call attempt from a mobile device, the originating gateway controller 21 confirms the request and transmits a resource assignment request message (3G-IOS_Assignment_Request) to the originating wireless gateway 22, demanding the assignment of radio channel resources.

The originating wireless gateway 22 receives the resource assignment request message (3G-IOS_Assignment_Request) and transmits a response message (3G-IOS-Assignment_Complete) to the originating gateway controller 21, in return. The originating gateway controller 21 enables the base station to select an available radio channel and causes TCP/IP ports at the side of the originating gateway controller 21 to be opened, by transmitting a connection instruction message (MGCP_CRCX to the originating wireless gateway 22. The MGCP_CRCX message instructs the originating wireless gateway 22 to assign resources for the connection to the core network 23. Thus, the instruction and confirmation of the resource assignment for the core network connection is conducted. Then, the originating wireless gateway 22 requests and confirms the radio assignment for the caller, in accordance with the resource assignment instruction of the originating gateway controller 21. Thereafter, it transmits a response message (MGCP_CRCX_Ack) including the information on the assigned core network connection, such as the core network IP address and IP port number, the bandwidth information, and etc., to the originating gateway controller 21.

Subsequently, the originating gateway controller 21 transmits an Initial Address Message (IAM; BICC_IAM) including information on the call receiver and the caller and the core network connection information of the originating wireless gateway 22, etc., to the terminating gateway controller 24. This message is used to request the BICC call connection.

The terminating gateway controller 24 transmits paging request messages (3G-IOS_Paging_Request) to wireless gateways under its management, by conducting the 3G-IOS paging procedure. The purpose of the paging request message (3G-IOS_Paging_Request) is to identify a terminating wireless gateway 25 currently connected with the call receiver.

Moreover, for the purpose of the tone provision function, the terminating gateway controller 24 transmits a tone connection instruction message (CRCX) to the tone gateway 26, requesting and confirming the resource assignment for the tone gateway's 26 connection to the core network 23.

Then, the tone gateway 26 transmits a response message (CRCX_Ack) including the information on the assigned core network connection, such as the core network IP address and IP port number, bandwidth information and so forth, to the terminating gateway controller 24.

Subsequently, the terminating gateway controller 24 transmits an APM message (BICC_APM) to the originating gateway controller 21, to provide the information on the core network connection of the tone gateway 26.

Then, the originating gateway controller 21 transmits a modification connection message (MDCX) to the originating wireless gateway 22, so as to transmit the information on the core network connection of the tone gateway 26, and receives a response message (MDCX_Ack) from the originating wireless gateway 22 in return.

Thereafter, the originating gateway controller 21 responds to the terminating gateway controller 24 by sending an APM message (BICC_APM).

Then, the terminating gateway controller 24 transmits to the tone gateway 26 a notification request message (RQNT) that includes a character string or a number indicating the pre-defined paging tone, so as to demand the provision of the paging tone.

Accordingly, the tone gateway 26 transmits a response message, (RQNT_Ack) in response to the notification request message (RQNT), to the terminating gateway controller 24 and, at the same time, transmits the paging tone (Paging_Tone) directly to the originating wireless gateway 22, via the core network 23, using the VoIP technology.

Thereafter, the terminating wireless gateway 25 presently connected with the call receiver transmits a paging response message (3G-IOS_Paging_Response) to the terminating gateway controller 24, to identify itself.

Upon receiving the paging response message, the terminating gateway controller 24 transmits a resource assignment request message (3G-IOS_Assignment_Request) to the terminating wireless gateway 25, requesting the radio resource assignment. The terminating wireless gateway 25 obtains and confirms the radio resource assignment for the call receiver and transmits a response message (3G-IOS_Assignment_Complete) in response to the resource assignment request message (3G-IOS_Assignment_Request). Simultaneously, the terminating wireless gateway 25 transmits an alert message (3G-IOS_Alert) to the terminating gateway controller 24, to inform it that the call receiver is not being called.

Then, the terminating gateway controller 24 transmits an address complete message (ACM) to the originating gateway controller 21, informing it that the call receiver is being called. Here, the ACM is a return message to indicating that all of the address information required to make the call connection to the call receiver has been received.

Thereafter, the terminating gateway controller 24 transmits a notification request message (RQNT), which includes a character string or a number indicating the pre-defined ring back tone, to the tone gateway 26, so as to request the ring back tone.

The tone gateway 26 transmits a response message (RQNT_Ack) to the terminating gateway controller 24, in response to the notification request message (RQNT) and, at the same time, provides the ring back tone (Ring_Back_Tone) directly to the originating wireless gateway 22, via the core network 23, using the VoIP technology.

Afterwards, when the terminating wireless gateway 25 transmits a connection message (3G-IOS_Connect) to the terminating gateway controller 24, informing it that the call receiver has responded to the call, the terminating gateway controller 24 transmits an answer message (ANM) to the originating gateway controller 21 to inform it that the call receiver has responded to the call. Here, the ANM is a return message, indicating that the call receiver has responded to the call and initializing the imposition of the service charge on the caller, in the case of a domestic call, or initializing the measurement of the communication time for the calculation of the international service charge, in the case of an international call.

Thereafter, the terminating gateway controller 24 requests and confirms the resource assignment for the connection with the core network 23, by transmitting a connection instruction message (CRCX) to the terminating wireless gateway 25. The CRCX message requests the resource assignment, for the core network connection of the terminating wireless gateway 25, using the bearer information of the originating wireless gateway 22 included in the IAM.

Then, the terminating wireless gateway 25 requests and confirms the radio resource assignment for the call receiver, in accordance with the resource assignment instruction from the terminating gateway controller 24, and transmits a response message (CRCX_Ack) to the terminating gateway controller 24. The CRCX_Ack message includes the information on the core network connection, such as the core network IP address and IP port number, the bandwidth information, and so forth.

The terminating gateway controller 24 transmits an APM message to the originating gateway controller 21 to deliver the core network connection information, such as the core network IP address and port number of the terminating wireless gateway 25, the bandwidth information, and so forth.

Upon receiving the APM message, the originating gateway controller 21 sends a modification access message (MDCX) to the originating wireless gateway 22, to deliver the information on the core network connection of the terminating wireless gateway 25. In return, the originating gateway controller 21 receives a response message (MDCX_Ack) from the originating wireless gateway 22.

Thereafter, the originating gateway controller 21 responds to the terminating gateway controller 24 by sending an APM message (BICC_APM).

Then, the voice connection between the originating wireless gateway 22 and the terminating wireless gateway 25 is established, via the core network 23, using the VoIP technology.

As described hereinabove, the present invention, in relaying calls in the next generation mobile communication network using the BICC, MGCP and 3G-IOS protocols, improves the VoIP products in the IP-based network by supporting the VoIP function between the originating gateway controller and the terminating gateway controller, while receiving the tone from an external tone generating device. This is accomplished by redefining the BICC signal processing procedures so that APM messages may be transmitted and received multiple times, between the originating gateway controller and the terminating gateway controller.

The above references are incorporated by reference herein where appropriate for appropriate teachings of additional or alternative details, features and/or technical background.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A call relaying method, comprising:
communicating messages using at least one of a Bearer Independent Call Control (BICC) protocol, a Media Gateway Control Protocol (MGCP), or a $3^{rd}$ Generation-Inter-Operability Specification (3G-IOS) protocol to induce an external tone gateway to generate a tone; and
relaying a call between an originating gateway controller and a terminating gateway controller using the tone and a modified BICC protocol, wherein the modified BICC protocol induces generation of the tone by transmitting and receiving messages containing connection information between the originating and terminating gateway controllers.

2. The method of claim 1, wherein the messages containing said connection information include Application Transport Mechanism (APM) messages.

3. The method of claim 1, wherein the MGCP protocol is used by the originating and terminating gateway controllers to control resources of the tone gateway.

4. The method of claim 1, wherein connecting the voice call comprises:
transmitting an access message from the terminating wireless gateway to the terminating gateway controller to signify a call receiver has responded to the voice call;
transmitting an Answer Message (ANM) from the terminating gateway controller to the originating gateway controller;
requesting and confirming a second resource assignment by transmitting a connection instruction message from the terminating gateway controller to the terminating wireless gateway;
transmitting a response message, including information on an assigned core network connection, from the terminating wireless gateway to the terminating gateway controller;
transmitting the information on the core network connection, of the terminating wireless gateway, by transmitting an APM message from the terminating gateway controller to the originating gateway controller;
transmitting a modification access message from the originating gateway controller to the originating wireless gateway and responding to the terminating gateway controller, through another APM message, after receiving a response message for the modification access message; and
establishing the voice call, via the core network connection between the originating wireless gateway and the terminating wireless gateway.

5. The method of claim 4, wherein the ANM is a return message indicating that the call receiver responded to the voice call and initiates the imposition of a service charge on the caller, in the case of a domestic call, or a measurement of a communication time, for the calculation of an international service charge, in the case of an international call.

6. A call relaying method, comprising:
requesting and confirming, with an originating gateway controller, a first resource assignment made by an originating wireless gateway for a core network connection;

searching for a terminating wireless gateway in accordance with a call connection request communicated from the originating gateway controller to a terminating gateway controller;

connecting the terminating gateway controller to a core network;

connecting a tone gateway to the core network using the terminating gateway controller;

generating a tone and transmitting the tone to a caller, with the tone gateway; and connecting a voice call, via the core network connection, between the originating wireless gateway and the terminating wireless gateway.

7. The method of claim 6, wherein connecting the terminal gateway controller to the core network comprises:

requesting a call connection by transmitting an Initial Address Message (IAM) from the originating gateway controller to the terminating gateway controller;

searching for the terminating wireless gateway, connected to a call receiver, by conducting paging request and response operations between the terminating gateway controller and the terminating wireless gateway;

requesting and confirming a second resource assignment at the terminating wireless gateway, using bearer information of the originating wireless gateway included in the transmitted IAM; and requesting and confirming a radio channel assignment, for the call receiver, with the terminating wireless gateway.

8. The method of claim 6, wherein generating the tone comprises:

requesting and confirming a second resource assignment at the tone gateway, using the terminating gateway controller, and transmitting a paging tone to the caller, in accordance with the request of the terminating gateway controller;

confirming a status of a call receiver and notifying the originating gateway controller of the status, with the terminating gateway controller; and providing a ring back tone to the caller, in accordance with the request of the terminating gateway controller, using the tone gateway.

9. The method of claim 8, wherein providing the paging tone comprises:

requesting and confirming the second resource assignment by transmitting a tone connection instruction message to the tone gateway, with the terminating gateway controller;

transmitting a response message including information on an assigned core network connection from the tone gateway to the terminating gateway controller;

transmitting bearer information of the tone gateway by transmitting an Application Transport Mechanism (APM) message from the terminating gateway controller to the originating gateway controller;

requesting and confirming a resource assignment modification by transmitting a modification connection message from the originating gateway controller to the originating wireless gateway and responding to the terminating gateway controller by sending another APM message;

requesting the paging tone by transmitting a notification request message from the terminating gateway controller to the tone gateway; and transmitting a response message, in response to the notification request message, from the tone gateway to the terminating gateway controller and providing the paging tone to the caller via the originating wireless gateway.

10. The method of claim 8, wherein providing the ring back tone comprises:

transmitting a response message to a paging request from the terminating wireless gateway to the terminating gateway controller;

requesting a radio channel resource assignment by transmitting a resource assignment request message from the terminating gateway controller to the terminating wireless gateway;

requesting and confirming the radio channel assignment for the call receiver, with the terminating wireless gateway, and transmitting a response message and an announcement message to the terminating gateway controller;

transmitting an Address Complete Message (ACM) from the terminating gateway controller to the originating gateway controller and requesting the ring back tone by transmitting a notification request message to the tone gateway; and transmitting a response message, in response to the notification request message, from the tone gateway to the terminating gateway controller and providing the ring back tone to the caller via the originating wireless gateway.

11. A call relaying system, comprising:

an originating wireless gateway that conducts modifications to a first resource assignment of an originating side, according to a first resource assignment modification instruction, and transmits information on a modified core network connection;

a terminating wireless gateway that conducts a second resource assignment of a terminating side, according to a second resource assignment instruction, and transmits information on an assigned core network connection;

a tone gateway that transmits information on the assigned core network connection, according to the second resource assignment instruction, and provides a tone according to a tone provision instruction;

a terminating gateway controller that communicates with the tone gateway and the terminating wireless gateway; and an originating gateway controller that communicates with the terminating gateway controller and the originating wireless gateway, wherein the originating and terminating gateway controllers control a call relay using a Bearer Independent Call Control (BICC) protocol which induces the tone gateway to provide the tone based on the tone provision instruction.

12. The system of claim 11, wherein:

the terminating gateway controller instructs and confirms the second resource assignment at the tone gateway, transmits an Application Transport Mechanism (APM) message, requests and confirms the tone gateway=s tone provision, requests and confirms the second resource assignment at the terminating wireless gateway, and transmits another APM message; and the originating gateway controller requests and confirms the modification of the first resource assignment according to the APM message of the terminating gateway controller and responds to the terminating gateway controller.

13. The system of claim 11, wherein a protocol stack between the originating and terminating gateway controllers and the tone gateway contains a Media Gateway Control Protocol (MGCP), an Internet Protocol (IP), and a Transfer Control Protocol (TCP) or an Asynchronous Transfer Mode (ATM).

14. The system of claim 11, wherein the originating and terminating gateway controllers, the originating and terminating wireless gateways, and the tone gateway are connected with one another via a core network, using the IP.

15. The system of claim 11, wherein the origination and terminating gateway controllers use a Media Gateway Control Protocol (MGCP) to control resources of the originating and terminating wireless gateways and the tone gateway.

* * * * *